US011164179B2

(12) United States Patent
Greiche et al.

(10) Patent No.: US 11,164,179 B2
(45) Date of Patent: Nov. 2, 2021

(54) SECURE CREDENTIAL STORAGE AND RETRIEVAL

(71) Applicant: Apple Inc., Cupertino, CA (US)

(72) Inventors: Hubert Greiche, Santa Clara, CA (US); Gianpaolo Fasoli, Redwood City, CA (US); Stacey R. Abrams, San Francisco, CA (US); Richard W. Heard, San Francisco, CA (US)

(73) Assignee: Apple, Inc., Cupertino, CA (US)

( * ) Notice: Subject to any disclaimer, the term of this patent is extended or adjusted under 35 U.S.C. 154(b) by 313 days.

(21) Appl. No.: 16/428,724

(22) Filed: May 31, 2019

(65) Prior Publication Data

US 2020/0234283 A1 Jul. 23, 2020

Related U.S. Application Data

(60) Provisional application No. 62/795,435, filed on Jan. 22, 2019.

(51) Int. Cl.
*G06Q 20/36* (2012.01)
*G06Q 20/40* (2012.01)
(Continued)

(52) U.S. Cl.
CPC ......... *G06Q 20/367* (2013.01); *G06Q 20/322* (2013.01); *G06Q 20/40145* (2013.01);
(Continued)

(58) Field of Classification Search
None
See application file for complete search history.

(56) References Cited

U.S. PATENT DOCUMENTS 8,775,757 B2  7/2014 Polzin et al.
8,832,465 B2  9/2014 Gulati et al.
(Continued)

OTHER PUBLICATIONS

"White Paper on FIDO", downloaded from https://globalplatform.org/wp-content/uploads/2018/04/White-Paper-Technical-FIDO-Auth-using-GlobalPlatform-Jan2018.pdf and attached as a PDF file, Jan. 2018. (Year: 2018).*

(Continued)

*Primary Examiner* — James D Nigh
*Assistant Examiner* — Margaret M Neubig
(74) *Attorney, Agent, or Firm* — Kowert, Hood, Munyon, Rankin & Goetzel, P.C.

(57) ABSTRACT

Techniques are disclosed relating to securely receiving and storing credentials. In some embodiments, a computing device includes an application executable to supply a credential to an external system. A secure circuit of the computing device is configured to send, to a credential storage, a request for the credential, the request including a first certificate identifying a first public key and a stipulation to perform a user authentication before permitting use of a first private key corresponding to the first public key. The secure circuit receives, from the credential storage, the credential encrypted using the first public key and, based on the stipulation, performs the user authentication prior to decrypting the credential and supplying it to the application. In some embodiments, the secure circuit receives the first certificate by providing information about hardware included in the computing device to a hardware verification service.

16 Claims, 7 Drawing Sheets

(51) Int. Cl.
    *H04L 9/08*           (2006.01)
    *H04L 9/32*           (2006.01)
    *G06Q 20/32*         (2012.01)

(52) U.S. Cl.
    CPC .......... *H04L 9/0866* (2013.01); *H04L 9/3247* (2013.01); *H04L 2209/80* (2013.01)

(56) References Cited

U.S. PATENT DOCUMENTS

| | | | |
|---|---|---|---|
| 8,873,747 | B2 | 10/2014 | Polzin et al. |
| 9,043,632 | B2 | 5/2015 | Machnicki et al. |
| 9,047,471 | B2 | 6/2015 | Polzin et al. |
| 9,547,778 | B1 | 1/2017 | Paaske et al. |
| 9,867,043 | B2 * | 1/2018 | Aissi ................... H04L 63/0876 |
| 2002/0026577 | A1 * | 2/2002 | Futamura .............. H04L 9/3273 |
| | | | 713/156 |
| 2011/0225427 | A1 * | 9/2011 | Wood .................. H04L 63/0823 |
| | | | 713/176 |
| 2011/0252234 | A1 | 10/2011 | De Atley et al. |
| 2014/0222688 | A1 * | 8/2014 | Haggerty ........... G06Q 20/1235 |
| | | | 705/71 |
| 2015/0046339 | A1 * | 2/2015 | Wong .................. G06Q 20/3829 |
| | | | 705/71 |
| 2015/0052064 | A1 * | 2/2015 | Karpenko .......... G06Q 20/3829 |
| | | | 705/71 |
| 2015/0127550 | A1 | 5/2015 | Khan |
| 2015/0213433 | A1 * | 7/2015 | Khan .................... H04L 9/0844 |
| | | | 705/71 |
| 2015/0339664 | A1 * | 11/2015 | Wong .................. H04W 12/069 |
| | | | 705/71 |
| 2015/0348008 | A1 | 12/2015 | Khan |
| 2017/0357830 | A1 | 12/2017 | Benson et al. |
| 2017/0373843 | A1 * | 12/2017 | Benson ................ H04L 63/062 |
| 2018/0219857 | A1 * | 8/2018 | Bhattacharya ...... H04L 63/0807 |
| 2018/0349585 | A1 | 12/2018 | Ahn et al. |

OTHER PUBLICATIONS

"Remote Credential Management with Mutual Attestation for Trusted Execution Environments", downloaded from 1804.10707.pdf (arxiv.org) and attached as a PDF file, Apr. 27, 2018. (Year: 2018).*
Apple Inc., Face ID Security, Nov. 2017, 6 pages.
Apple Inc., iOS Security, iOS 11, Jan. 2018, 82 pages.
International Search Report and Written Opinion in PCT Appl. No. PCT/US2020/014271 dated Apr. 9, 2020, 13 pages.

* cited by examiner

SECURE CREDENTIAL STORAGE AND RETRIEVAL

The present application claims priority to U.S. Prov. Appl. No. 62/795,435, filed Jan. 22, 2019, which is incorporated by reference herein in its entirety.

BACKGROUND

Technical Field

This disclosure relates generally to computing devices, and, more specifically, to securely storing credential information.

Description of the Related Art

A user conducting an online transaction via a merchant web site may need to enter various information in order to facilitate a transaction with the merchant. For example, the user may need to provide an authentication credential (e.g., user name and password), payment credential (e.g., credit card number), etc. To simplify the process of reentering this information for subsequent uses, a merchant may offer to store some of this information for subsequent use. Alternatively, a user's computing device may offer to store this information locally. For example, the device's web browser may implement a digital wallet operable to store payment information. When a user interacts with a merchant to perform a subsequent transaction, the digital wallet can provide the payment information without requiring the user to enter this information.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform a biometric authentication" is intended to cover, for example, a circuitry included in an integrated circuit that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first certificate and a second certificate. The term "first" is not limited to the initial certificate to be received by the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, a computing device may receive a credential from an entity external to the computing device and different from the user. For example, an issuing authority of a transaction instrument (e.g., a credit card) may provide a payment credential to the computing device, which can be used to facilitate one or more transactions associated with the transaction instrument. As another example, an airline may provide a ticket credential to the computing device, which may be presented to clear airport security and obtain permission to board an airline flight. Ensuring that this information is maintained at the computing device in a secure manner can be important to the credential provider as it may reduce the potential for fraud.

The present disclosure describes embodiments in which a computing device includes hardware for securely receiving and storing a payment credential. As will be described below, in various embodiments, a computing device may include an application executable to supply a credential received from a credential storage external to the computing device. To obtain the credential, a secure circuit of the computing device sends a request for the credential to the credential storage. The request may include a first certificate identifying a first public key and a stipulation to perform a user authentication before permitting use of a first private key corresponding to the first public key. The credential storage may confirm the presence of the stipulation and, in response, encrypt the requested credential using the first public key. The secure circuit may then receive the encrypted credential and, based on the stipulation, perform the user authentication prior to decrypting the credential and supplying it to the application for delivery. In some embodiments, the secure circuit obtains the first certificate by providing information about hardware included in the computing device (such as the inclusion of the secure circuit) to a hardware verification service, which may be associated with a manufacturer of the device and operable to confirm the provided information. In many instances, obtaining a credential in this manner may allow a credential provider to have greater confidence that a credential is being securely communicated and maintained.

Figure 1:
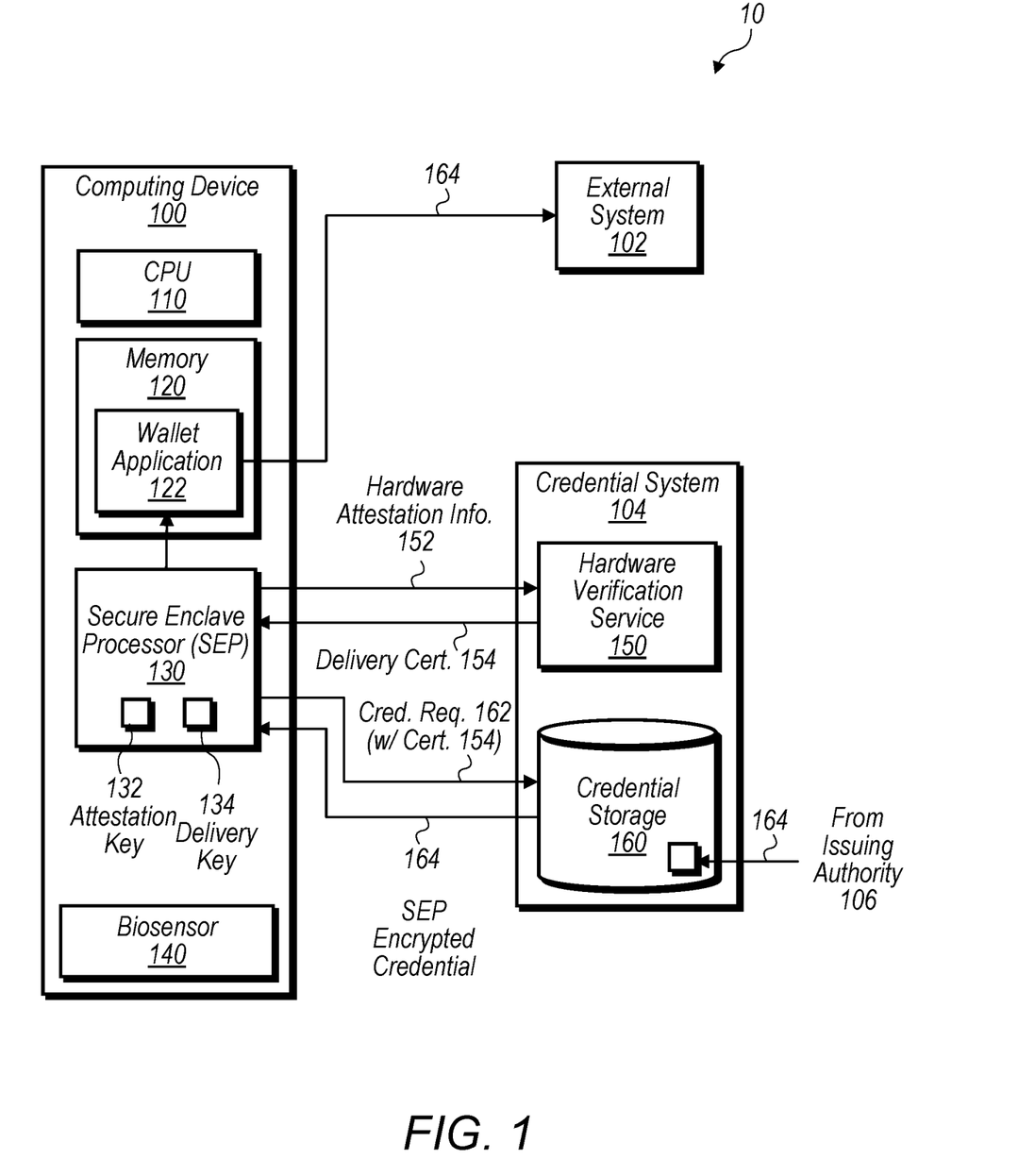
FIG. 1 is a block diagram illustrating an example of a system for securely communicating credential information to a computing device configured to perform a user authentication.

Turning now to FIG. 1, a block diagram of a system 10 for securely communicating credential information is depicted. In the illustrated embodiment, system 10 includes a computing device 100, an external system 102, and credential system 104. As shown, computing device 100 includes a central processing unit (CPU) 110, memory 120 including a wallet application 122, secure enclave processor (SEP) 130, and biosensor 140. Credential system 104 includes hardware verification service 150 and credential storage 160. In some embodiments, system 10 may be implemented differently than shown. For example, in some embodiments, computing device 100 may include more components than shown such as those described below with respect to FIGS. 3 and 6, service 150 and storage 160 may be associated with separate systems, etc.

Wallet application 122, in various embodiments, is an application executable to maintain and provide credentials 164, which may be consumed by a system 102 external to device 100. These credentials may correspond to any suitable form of credential. For example, in some embodiments, credential 164 is an authentication credential usable to confirm an identity of a user of device 100 such as user name and password, a digital signature, etc. As another example, in some embodiments, credential 164 is a payment credential usable by external system 102 to conduct a transaction and may include a primary account number (PAN), a card verification value (CVV), expiration date, network information, billing address information, etc. In some embodiments, PAN may be (or may be replaced with) a device-specific account number (DAN) that is unique to device 100 and used in lieu of the PAN in order to improve transaction security. In some embodiments, the CVV may be (or may be replaced with) a dynamic security code (DSC) that is unique to a given transaction and may be generated using a cryptographic key and a transaction number. As yet another example, in some embodiments, credential 164 is a token redeemable for a service and/or product such as a concert ticket, airline ticket, coupon, gift card, etc. Wallet application 122 may also provide credentials 164 in any suitable manner. Accordingly, in some embodiments, application 122 may populate a form provided by external system 102. For example, if the credential 164 is a payment credential, application 122 may populate a payment form included in a merchant webpage supplied by external system 102 such as populating a first field with a PAN of the payment credential and populating a second field with a CVV of the payment credential. In some embodiments, application 122 may provide the credential via a display of computing device 100 such as presenting the credential 164 to a person for manual entry, presenting a quick response (QR) code with the credential 164 to be scanned by external system 102, etc. In some embodiments, application 122 may use a network interface of device 100 to convey the credential such as a near field communication (NFC) interface, Wi-Fi™ interface, Bluetooth® interface, etc. As will be described in greater detail below, in various embodiments, credentials 164 are obtained from credential system 104, which may further obtain the credentials from various issuing authorities 106.

SEP 130, in various embodiments, is a secure circuit configured to facilitate retrieval and local storage of credentials 164 from credential system 104. As used herein, the term "secure circuit" refers to a circuit that protects an isolated, internal resource from being directly accessed by an external circuit. This internal resource may be memory that stores sensitive data such as personal information (e.g., biometric information, credit card information, etc.), encryptions keys (e.g., attestation key 132 and delivery key 134 discussed below), random number generator seeds, etc. This internal resource may also be circuitry that performs services/operations associated with sensitive data. As will be described below with respect to FIG. 3, this circuitry may include circuitry (e.g., a biometric sensor pipeline) that is configured to perform a user authentication of the user, which may be based on biometric data captured by biosensor 140 discussed below and, in some embodiments, an expressed intention from the user to authorize performance of the authentication. In various embodiments, SEP 130 may receive a request from wallet application 122 to obtain a particular credential 164 and, in response to the request, initially contact hardware verification service 150 of credential system 104.

Hardware verification service 150, in various embodiments, is a service provided by a computing system configured to verify the presence of particular hardware and/or software in computing devices 100. As shown in FIG. 1, SEP 130 may begin the process of obtaining a credential 164 by providing hardware attestation information 152 to service 150 for verification. As will be described in greater detail below with FIG. 2A, hardware attestation information 152 may include various information about the hardware and/or software of device 100 such as the presence of SEP 130 and biosensor 140. In the illustrated embodiment, this information may be signed by an attestation key 132 maintained by SEP 130, which, in some embodiments, generates attestation key 132 (or a key used to derive key 132) during a fabrication of computing device 100 and registers key 132 with device 100's manufacturer, which may operate service 150. In various embodiments, SEP 130 also generates a public key pair having a delivery key 134 as the private key and includes a corresponding certificate signing request (CSR) with information 152 in order to obtain a corresponding delivery certificate 154. In some embodiments, this CSR further includes a stipulation to perform a user authentication before permitting use of delivery key 134. Hardware verification service 150 may then verify this received information including hardware attestation information 152 and issue, to SEP 130, a delivery certificate 154, which, in some embodiments, includes the stipulation included in the CSR. Once SEP 130 has obtained delivery certificate 154, SEP 130 may contact credential storage 160 for the credential 164 requested by wallet application 122.

Credential storage 160, in various embodiments, is a computing system configured to maintain various credentials 164. In the illustrated embodiment, SEP 130 sends a credential request 162 for the credential 164 requested by wallet application 122 and includes delivery certificate 154 with the request 162. In response to receiving the request 162, storage 160 performs a verification of delivery certificate 154, which may include determining whether delivery certificate 154 includes the stipulation for SEP 130 to perform a user authentication prior to permitting use of delivery key 134. If storage 160 can successfully verify the certificate 154 and confirm the presence of the stipulation, storage 160 may encrypt the requested credential 164 with the public key included in certificate 154 and corresponding to delivery key 134. Storage 160 may then supply the encrypted credential 164 to SEP 130 for subsequent decryption. If, however, storage 160 is able to successfully verify certificate 154 but determines that certificate 154 lacks a stipulation to perform a user authentication, storage 160 may still, in some embodiments, provide a portion of the requested credential, but not all of credential 164. For example, in one embodiment in which credential 164 is a payment credential, storage 160 may provide the encrypted primary account number, but omit the card verification value—allowing a user to still potentially perform a transaction if he or she can remember the card verification value from a previous transaction or obtain it via an alternate channel.

In various embodiments, after SEP 130 receives the encrypted credential 164, SEP 130 performs a user authentication based on the stipulation provided in its earlier CSR and included in delivery certificate 154. In the illustrated embodiment, this user authentication may be a biometric authentication based on biometric information collected by biosensor 140; however, SEP 130 may perform other forms of user authentication such as confirming authentication information supplied by a user (e.g., a passcode entered into a touch display of computing device 100). If the user authentication is successful, SEP 130 may use delivery key 134 to decrypt the encrypted credential 164 and supply the decrypted credential 164 to wallet application 122. In some embodiments, SEP 130 also stores the received credential 164 in memory 120 in its encrypted form in order to service subsequent requests from application 122 without having to contact credential system 104 to reobtain credential 164. Accordingly, if wallet application 122 issues a subsequent request for the credential 164, SEP 130 can retrieve the encrypted credential from memory 120, perform a user authentication, and supply the decrypted credential 164 to application 122 in response to a successful authentication.

Figure 2A:
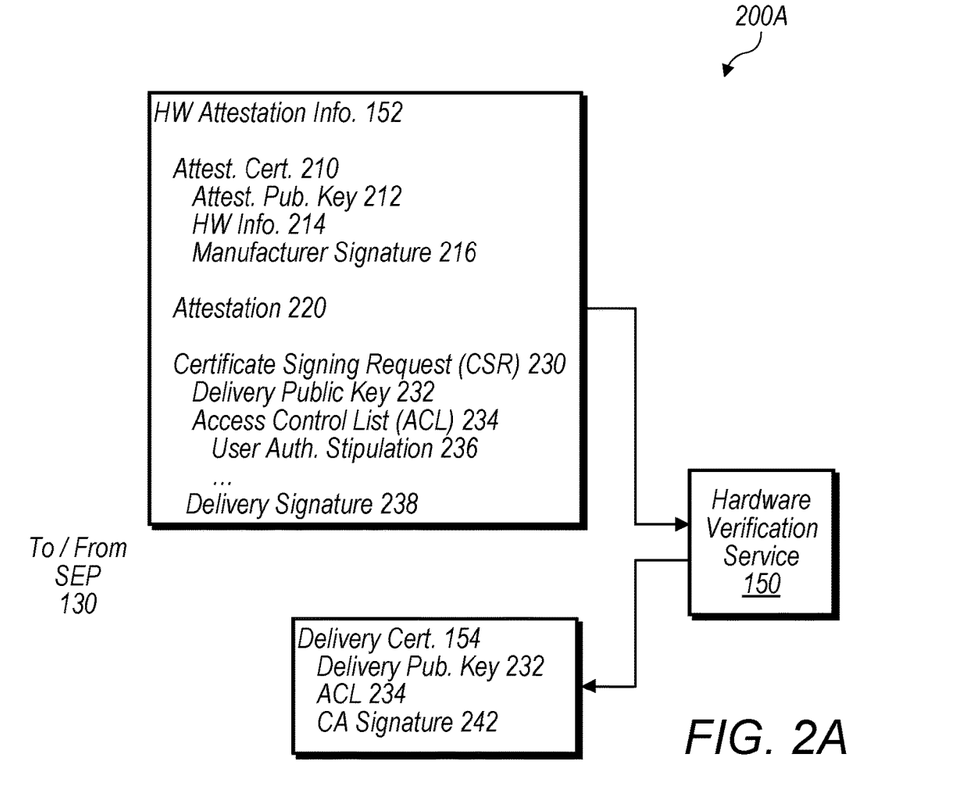
FIGS. 2A and 2B are block diagrams illustrating examples of information exchanged with a device verification service and a credential storage shown in FIG. 1.

Turning now to FIG. 2A, a block diagram of an exchange 200A between SEP 130 and hardware verification service 150 is depicted. In the illustrated embodiment, exchange 200A includes SEP 130 sending hardware attestation information 152, which may include an attestation certificate 210, attestation 220, and a CSR 230. SEP 130 may then receive a delivery certificate 154 in response to a successful verification of information 152. In some embodiments, exchange 200A may be implemented differently than shown.

Attestation certificate 210, in various embodiments, is a certificate usable to attest to the hardware and/or software included in computing device 100. In the illustrated embodiment, certificate 210 includes an attestation public key 212, hardware information 214, and manufacture signature 216. In various embodiments, attestation public key 212 is a certified public key corresponding to attestation key 132 and usable to decrypt data/verify digital signatures generated by attestation key 132 such as attestation 220 discussed below. In various embodiments, information 214 identifies various information about the hardware and/or software of computing device 100 and may include any suitable information such as a group identifier (GID) identifying a particular generation of a device 100, an operating system version number, a unique identifier of device 100, an identification of SEP 130 and/or biosensor 140, application names, etc. In various embodiments, manufacturer signature 216 is a digital signature generated by a manufacturer of device 100 attesting to the validity of certificate 210 including the validities of public key 212 and information 214.

Attestation 220, in various embodiments, is a digital signature generated by attestation key 132 from hardware attestation information 152. Accordingly, service 150 may use attestation 220 in conjunction with attestation public key 212 to verify the integrity of information 152 and authenticate SEP 130.

CSR 230, in various embodiments, is request for a delivery certificate 154 to certify delivery key 134 used to decrypt credentials 164. In the illustrated embodiment, CSR 230 includes a delivery public key 232 corresponding to delivery key 134 and an access control list 234. In various embodiments, access control 234 places various restrictions on delivery key 134 such as the algorithm to be used (e.g., RSA, DSA, etc.), the timeframe for which delivery key 134 is valid, etc. As shown, access control list 234 also includes the stipulation 236 to perform a user authentication prior to using delivery key 134. CSR 230 may further include a delivery signature 238 generated using delivery key 134 from information in CSR 230 and usable to verify CSR 230.

Delivery certificate 154, in various embodiments, includes delivery public key 232, access control list 234, and a certificate authority (CA) signature 242. As noted above, delivery public key 232 may be used by storage 160 to encrypt a requested credential 164. Before doing so, storage 160 may confirm the presence of access control list 234 including the user authentication stipulation 236. Service 150, which may implement a CA, may generate a signature 242 from information 232 and 234 in order to attest to its validity.

Figure 2B:
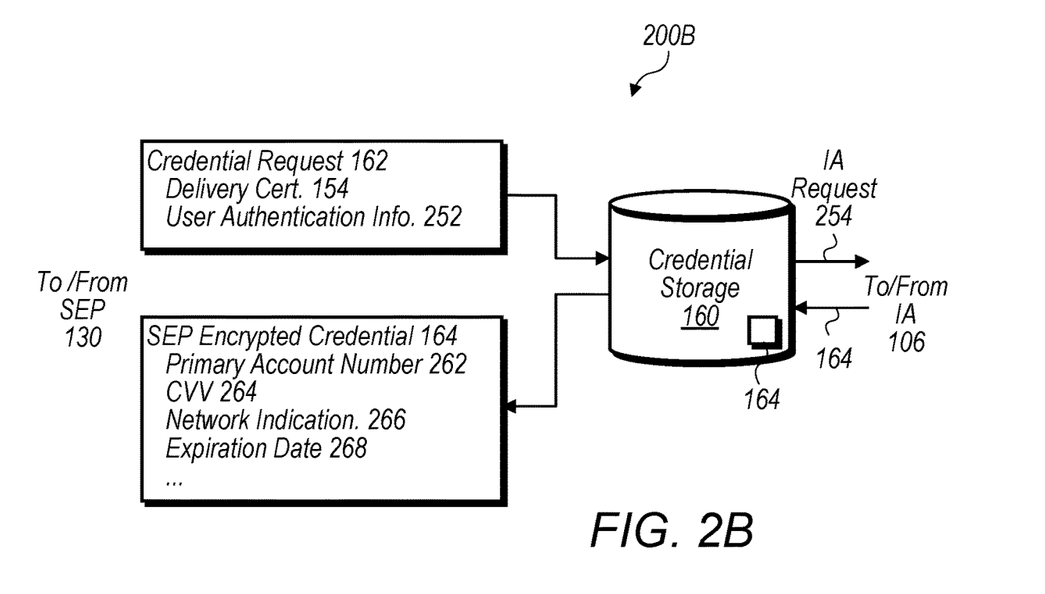

Turning now to FIG. 2B, a block diagram of an exchange 200B between SEP 130 and credential storage 160 is depicted. In the illustrated embodiment, exchange 200B includes the sending of a credential request 162 including delivery certificate 154 obtained from exchange 200B. In some embodiments, request 162 may include additional user authentication information 252 such as a user name and password associated with credential system 104. In response to verifying this information, storage 160 may contact the issuing authority 106 for a credential 164 if it does not currently store the credential 164 by sending an issuing authority request 254. After receiving the requested credential 164 from the issuing authority 106, storage may encrypt the credential using delivery public key 232 included in delivery certificate 154 and convey the encrypted credential 164 to SEP 130. In the example depicted in FIG. 2B, encrypted credential 164 is a payment credential, which may include primary account number 262, CVV 264, network indication 266, expiration date 268, etc.; however, credential 164 may include different information such as a device account number and/or a dynamic security code as noted above. In some embodiments, exchange 200B may be implemented differently than shown.

Figure 3:
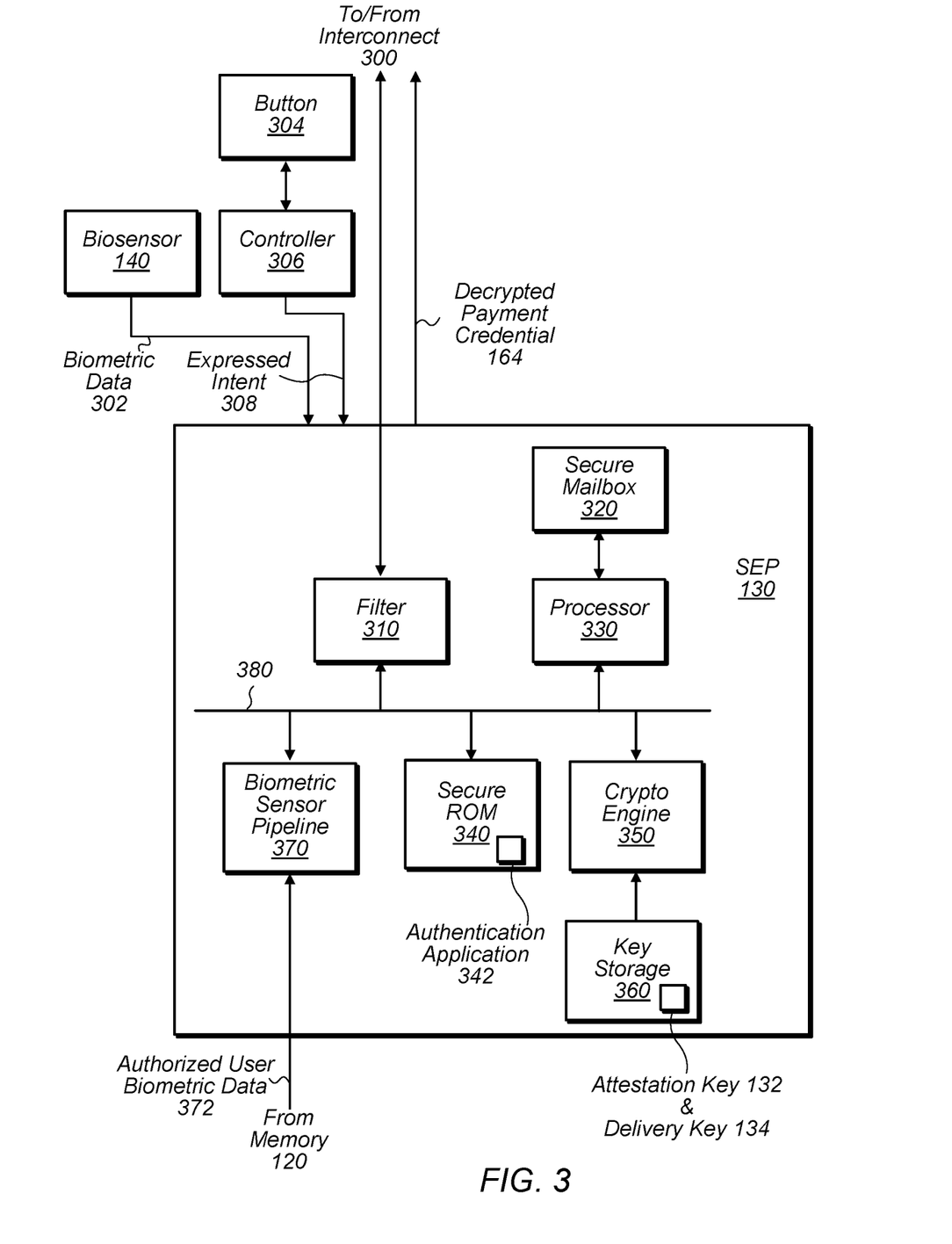
FIG. 3 is a block diagram illustrating an example of a secure circuit within the computing device shown in FIG. 1.

Turning now to FIG. 3, a block diagram of SEP 130 is depicted. As noted above, in various embodiments, SEP 130 is a secure circuit configured to perform a biometric authentication, which may include assessing biometric data collected by biosensor 140 and, in some embodiments, an expressed intent 308 from a button 304 coupled to a controller 306.

Biosensor 140, in one embodiment, is configured to collect biometric data 302 for a user of computing device 100. As used herein, "biometric data" refers to data that uniquely identifies the user among other humans (at least to a high degree of accuracy) based on the user's physical or behavioral characteristics. Biosensor 140 may use any suitable technique to collect biometric data 302. For example, in some embodiments, biosensor 140 is a finger print sensor that captures fingerprint data from the user. Accordingly, SEP 130 may maintain previously captured fingerprint data of an authorized user and compare it against newly received fingerprint data from biosensor 140 in order to authenticate a user. In some embodiments, biosensor 140 collects other types of biometric data 302 such as voice recognition (identifying the particular user's voice), iris scanning, etc. In still other embodiments, biosensor 140 may include an infrared (IR) emitter and an IR camera that are configured to capture multiple flood and depth image frames. When capturing a flood frame, the IR emitter may emit light from a single source, and the IR camera may collect two-dimensional image data from a user's face. When capturing a depth image frame, the IR emitter may project multiple light sources onto a user's face, and the IR camera may capture the reflections of those light sources to determine multiple depth points indicating distances from the IR camera to respective portions of the user's face. In some embodiments, the combination of flood and depth image data may allow for SEP 130 to compare faces in a three-dimensional space. In other embodiments, biosensor 140 is configured to capture a two-dimensional image in the visible-light spectrum. In various embodiments, biosensor 140 communicates biometric data 302 to SEP 130 via a secure channel. As used herein, the term "secure channel" refers to either a dedicated path for communicating data (i.e., a path shared by only the intended participants) or communicating encrypted data using cryptographic keys known only to the intended participants.

Button 304, in one embodiment, is a switch configured to receive a mechanical input from a user. In some embodiments, button 304 may extrude from the housing of computing device 100 such that a user can press button 304 to provide the mechanical input. As noted above, in various embodiments, a user may press button 304 to express authorization for performance of an authentication. In some instances, a user may press button 304 in response to a prompt provided by application 122 instructing the user how to participate in the authentication. In the illustrated embodiment, button controller 306 is a circuit configured to detect when button 304 has been pressed and send a corresponding indication 308 of expressed intent/authorization to SEP 130. Accordingly, controller 155 may be configured to supply a voltage to an input of button 304 and determine whether the voltage is present at an output, indicating the button 304 has been pressed. In some embodiments, button controller 306 is configured to provide authorization indication 308 to SEP 130 via a secure channel. In various embodiments, button 304 and controller 306 may be used for additional purposes other than merely authorizing an authentication. For this reason, controller 306 may provide authorization indication 308 in response to a distinct input—e.g., two or more presses of button 304. For example, button 304 may correspond to the power button for computing device 100, and button controller 306 may be configured to manage power supplied to one or more components of computing device 100.

As shown in the illustrated embodiment, SEP 130 includes a filter 310, secure mailbox 320, processor 330, secure ROM 340, cryptographic engine 350, a key storage 360, and an image sensor pipeline 370 coupled together via an interconnect 380. In some embodiments, SEP 130 may include more (or less) components than shown in FIG. 3. As noted above, SEP 130 is a secure circuit that protects an internal, resource such as components attestation keys 132, deliver key 134, and/or image sensor pipeline 370. As discussed below, SEP 130 implements a secure circuit through the use of filter 310 and secure mailbox 320.

Filter 310 is circuitry configured to tightly control access to SEP 130 to increase the isolation of the SEP 130 from the rest of the computing device 100, and thus the overall security of the device 100. More particularly, in one embodiment, filter 310 may permit read/write operations from a CPU 110 (or other peripherals on an interconnect 300 coupling CPU 110 and SEP 130) to enter SEP 130 only if the operations address the secure mailbox 320. Other operations may not progress from the interconnect 300 into SEP 130. Even more particularly, filter 310 may permit write operations to the address assigned to the inbox portion of secure mailbox 320, and read operations to the address assigned to the outbox portion of the secure mailbox 320. All other read/write operations may be prevented/filtered by the filter 310. In some embodiments, filter 310 may respond to other read/write operations with an error. In one embodiment, filter 310 may sink write data associated with a filtered write operation without passing the write data on to local interconnect 380. In one embodiment, filter 310 may supply nonce data as read data for a filtered read operation. Nonce data (e.g., "garbage data") may generally be data that is not associated with the addressed resource within the SEP 130. Filter 310 may supply any data as nonce data (e.g. all zeros, all ones, random data from a random number generator, data programmed into filter 310 to respond as read data, the address of the read transaction, etc.). In various embodiments, filter 310 may only filter incoming read/write operations. Thus, the components of the SEP 130 may have full access to the other components of computing device 100 including CPU 110, memory 120, biosensor 140, and/or button controller 306. Accordingly, filter 310 may not filter responses from interconnect 300 that are provided in response to read/write operations issued by SEP 130.

Secure mailbox 320 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from CPU 110. The outbox may store write data from write operations sourced by processor 330. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 110 (e.g., application 122) may request services of SEP 130 via an application programming interface (API) supported by an operating system of computing device 100—i.e., a requester may make API calls that request services of SEP 130. These calls may cause corresponding requests to be written to mailbox mechanism 320, which are then retrieved from mailbox 320 and analyzed by processor 330 to determine whether it should service the requests. This API may be used by application 122 to request a decrypted credential 164, deliver biometric data 302 and authorization indication 308 to mailbox 320, and deliver a decrypted credential via mailbox 320. By isolating SEP 130 in this manner, integrity of biometric sensor pipeline 370, for example, may be enhanced.

SEP processor 330 is configured to process commands received from various sources in computing device 100 (e.g. from CPU 110) and may use various secure peripherals to accomplish the commands. Processor 330 may then execute instructions stored in ROM 340 such as authentication application 342 to perform an authentication of a user. For example, SEP processor 330 may execute application 342 to provide appropriate commands to image sensor pipeline 370 in order to verify biometric data 302 and/or indication 308. In some embodiments, application 342 (or another application executed by processor 330) may facilitate the exchanges with hardware service verification 150, credential storage 160, and wallet application 122. In some embodiments, application 342 may include encrypted program instructions loaded from a trusted zone in memory 120.

Secure ROM 340 is a memory configured to store program instruction for booting SEP 130. In some embodiments, ROM 340 may respond to only a specific address range assigned to secure ROM 340 on local interconnect 380. The address range may be hardwired, and processor 330 may be hardwired to fetch from the address range at boot in order to boot from secure ROM 340. Filter 310 may filter addresses within the address range assigned to secure ROM 340 (as mentioned above), preventing access to secure ROM 340 from components external to the SEP 130. In some embodiments, secure ROM 340 may include other software executed by SEP processor 330 during use. This software may include the program instructions to process inbox messages and generate outbox messages, etc.

Cryptographic engine 350 is circuitry configured to perform cryptographic operations for SEP 130, including key generation as well as encryption and decryption using keys in key storage 360. Cryptographic engine 350 may implement any suitable encryption algorithm such as DES, AES, RSA, etc. In some embodiments, engine 350 may further implement elliptic curve cryptography (ECC). In various embodiments, engine 350 is responsible for generating keys 132 and 134 and performing cryptographic operations using keys 132 and 134. Engine 350 may also decrypt traffic received from biosensor 140 and button controller 306 described above.

Key storage 360 is a local memory (i.e., internal memory) configured to store cryptograph keys. In some embodiments, these keys may include keys used to establish the secure channels between SEP 130 and elements 140 and 306. As shown, in some embodiments, these keys include attestation keys 132 and delivery key 134. Accordingly, engine 350 may read key 132 from memory 360 when generating attestation 220 and key 134 when decrypting an encrypted credential 164.

Biometric sensor pipeline 370, in one embodiment, is circuitry configured to compare biometric data 302 captured from a user being authenticated with biometric data 372 of an authorized user. In some embodiments, biometric data 372 may be obtained through performance of a registration process in which biosensor 140 captures biometric data 302 from an authorized user in order to permit SEP 130 to subsequently authenticate the user. In some embodiments, pipeline 370 may perform the comparison using a collection of neural networks included in pipeline 370, each network being configured to compare biometric data 302 captured in a single frame with biometric data 372 captured in multiple frames for an authorized user. As shown, pipeline 370 may be configured to read, from memory 120, biometric data 372, which may be protected by encryption in some embodiments or being stored in an associated part of memory 120 that is only accessible to SEP 130. (In another embodiment, SEP 130 may store data 372 internally.) In some embodiments, pipeline 370 may also verify the presence of an expressed intent/authorization indication 308. (In other embodiments, this verification may be performed by another element of SEP 130 such as authentication application 342). In such an embodiment, this verification may include comparing a timestamp provided by controller 306 against the current time and determining whether the difference between the timestamp and the current time exceeds a threshold value—exceeding the threshold value resulting in a failure of the authentication. Based on the comparison of biometric data 302 and the presence of authorization indication 308, SEP 130 may provide an authentication result indicating whether the authentication was successful or failed—and may further provide a decrypted credential 164 based on the result of the authentication.

Figure 4:
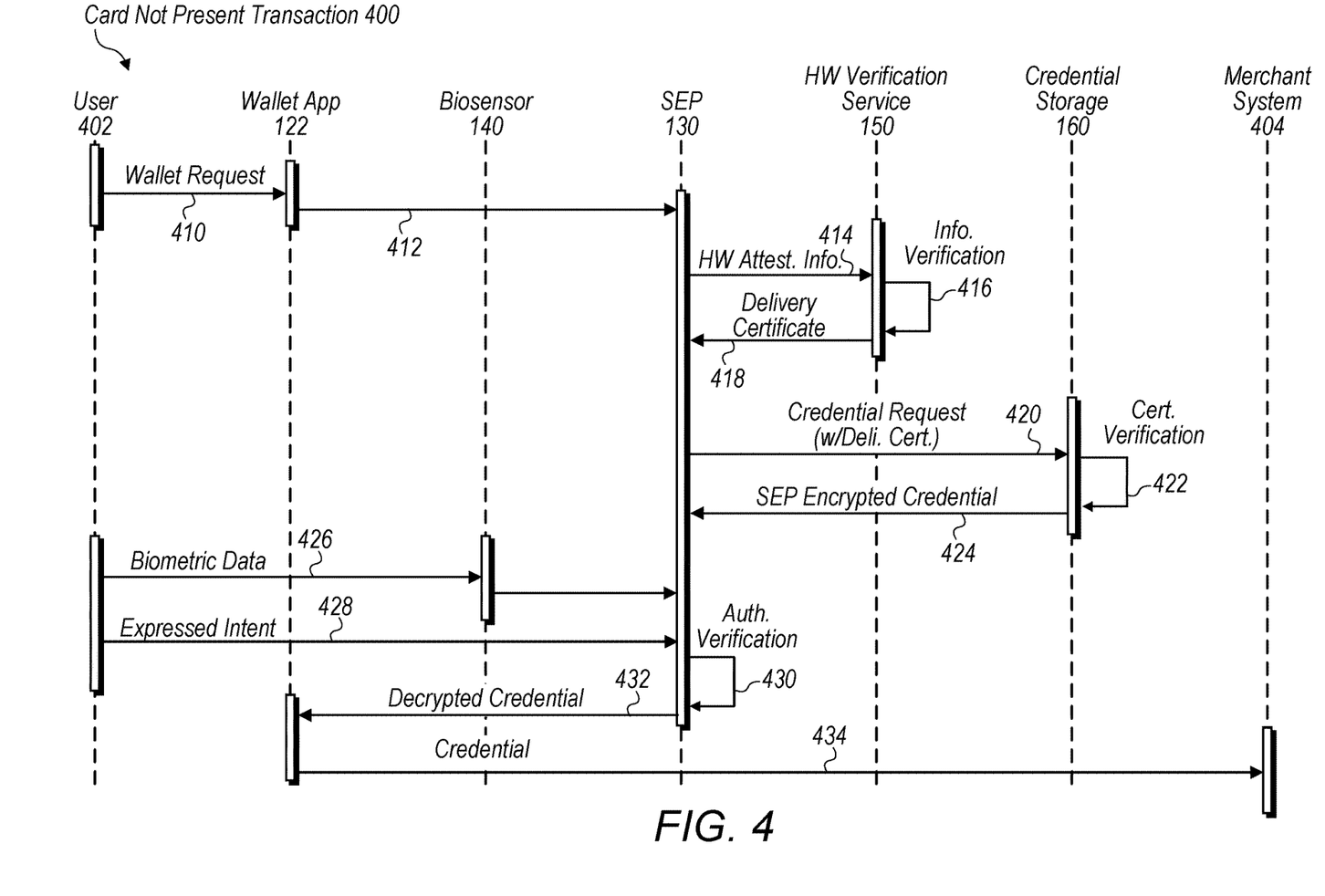
FIG. 4 is a communication diagram illustrating an example of an exchange to securely convey a payment credential to a merchant system.

Turning now to FIG. 4, a communication diagram of an exemplary exchange 400 to securely communicate a payment credential 164 is depicted. In various embodiments, exchange 400 may be used to perform a card-not-present transaction (i.e., a transaction made where the cardholder does not or cannot physically present the card/transaction instrument for a merchant's visual examination at the time that an order is given and payment effected).

As shown, exchange 400 may begin at 410 with a user 402 making a request to wallet application 122 to obtain a credential 164. Wallet application 122 may, in turn, contact SEP 130 at 412, which may convey hardware attestation information 152 at 414 to verification service 150. At 416, service 150 may verify the information 152 and issue a corresponding delivery certificate 154 at 418 to SEP 130. At 420, SEP 130 may include the issued delivery certificate 154 with a credential request 162 sent to credential storage 160. In response to receiving the request 162, storage 160 may perform a verification of the certificate 154 at 422 including confirming the presence of a user authentication stipulation 236. After a successful verification, storage 160 may supply at 424 the requested credential encrypted using public key 232. At 426, biosensor 140 may collect biometric data 302 from user 402 and provide it to SEP 130. At 428, user 402 may also provide an expressed intent 308 to indicate that this biometric-data collection and subsequent authentication are authorized by user 402. At 430, SEP 130 may perform the user authentication by verifying this information received from user 402. In response to the authentication being successful, SEP 430 may decrypt the credential 164 and provide it at 432 to wallet application 122, which may convey credential 164 to a merchant system 404 at 434.

In some embodiments, exchange 400 may be implemented differently than shown. For example, in another embodiment, wallet application 122 may merely present credential 164 on a display of device 100 and have user 402 separately provide credential 164 to merchant system 404.

Figure 5A:
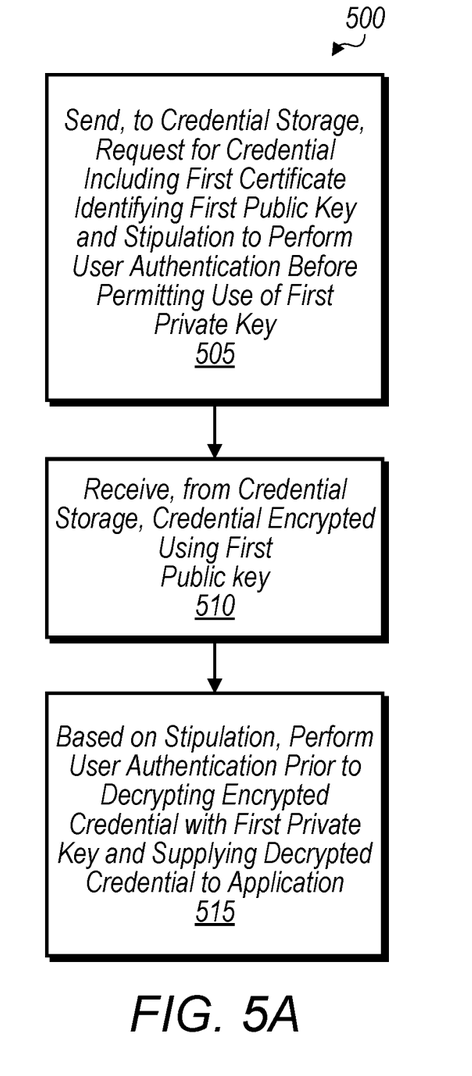
FIGS. 5A-5C are flow diagrams illustrating examples of methods for securely communicating credential information.

Turning now to FIG. 5A, a block diagram of a method 500 for securely communicating a payment credential is depicted. Method 500 is one embodiment a method performed by a computing device having a secure circuit and an application executable to supply a credential to an external system such as SEP 130 and wallet application 122.

In step 505, the secure circuit of the computing device sends, to a credential storage (e.g., storage 160), a request (e.g., request 162) for the credential (e.g., credential 164). In various embodiments, the request includes a first certificate (e.g., delivery certificate 154) identifying a first public key (e.g., delivery public key 232) and a stipulation (e.g., stipulation 236) to perform a user authentication before permitting use of a first private key (e.g., delivery key 134) corresponding to the first public key. In various embodiments, method 500 includes the secure circuit providing information (e.g., hardware attestation information 152) about hardware included in the computing device to a hardware verification service (e.g., service 150) and, in response to a verification of the provided information, receives the first certificate from the hardware verification service. In some embodiments, providing the information to the hardware verification service includes providing a second certificate (e.g., attestation certificate 210) that indicates a presence of the secure circuit in the computing device, generating an attestation (e.g., attestation 220) using a second private key (e.g., attestation key 132) maintained by the secure circuit and corresponding to a second public key (e.g., attestation public key 212) included in the second certificate, and issuing the attestation with a certificate signing request (CSR) (e.g., CSR 230) to obtain the first certificate from the hardware verification service in response to a verification of the attestation and the second certificate. In such an embodiment, the CSR may indicate the stipulation (e.g., stipulation 236 included in ACL 234) to perform the user authentication before permitting use of the first private key. In some embodiments, the secure circuit is provisioned with the second certificate by a manufacture of the computing device.

In step 510, the secure circuit receives, from the credential storage, the credential encrypted using the first public key.

In step 515, the secure circuit performs, based on the stipulation identified in the first certificate, the user authentication prior to decrypting the encrypted credential with the first private key and supplying the decrypted credential to the application. In some embodiments, the credential is a payment credential usable by a merchant system (e.g., merchant system 404) to conduct a transaction, and the application is executable to receive the decrypted payment credential from the secure circuit and populate a payment form of a merchant system with the decrypted payment credential. In some embodiments, the payment form is a webpage of the merchant system, and populating the payment form includes populating a first field with a primary account number of the payment credential and a second field with a card verification value (CVV) of the payment credential. In various embodiments, the secure circuit is configured to perform the user authentication by retrieving biometric data (e.g. biometric data 372) of an authorized user of the computing device, comparing biometric data (e.g., biometric data 302) collected by a biosensor with the retrieved biometric data of the authorized user, and based on the comparing, determining whether to use the first private key to decrypt the credential in response to a request from the application. In some embodiments, a controller circuit (e.g., controller 306) coupled to a button (e.g., button 304) detects when the button has been pressed and provides, to the secure circuit, a timestamp corresponding to the button being pressed, and performing the user authentication includes the secure circuit confirming that the timestamp is within an interval of the camera collecting the biometric data from the user's face. In some embodiments, the secure circuit is isolated from access except through a mailbox mechanism (e.g., mailbox 320), and the secure circuit supplies the decrypted credential to the application via the mailbox mechanism.

In some embodiments, method 500 includes the secure circuit storing the received encrypted credential for one or more subsequent uses without another retrieval of the credential from the credential storage and receive a request from the application to use the credential. In response to the request from the application, the secure circuit performs, based on the stipulation, the user authentication and, based on the user authentication, uses the first private key to decrypt the stored encrypted credential.

Figure 5B:
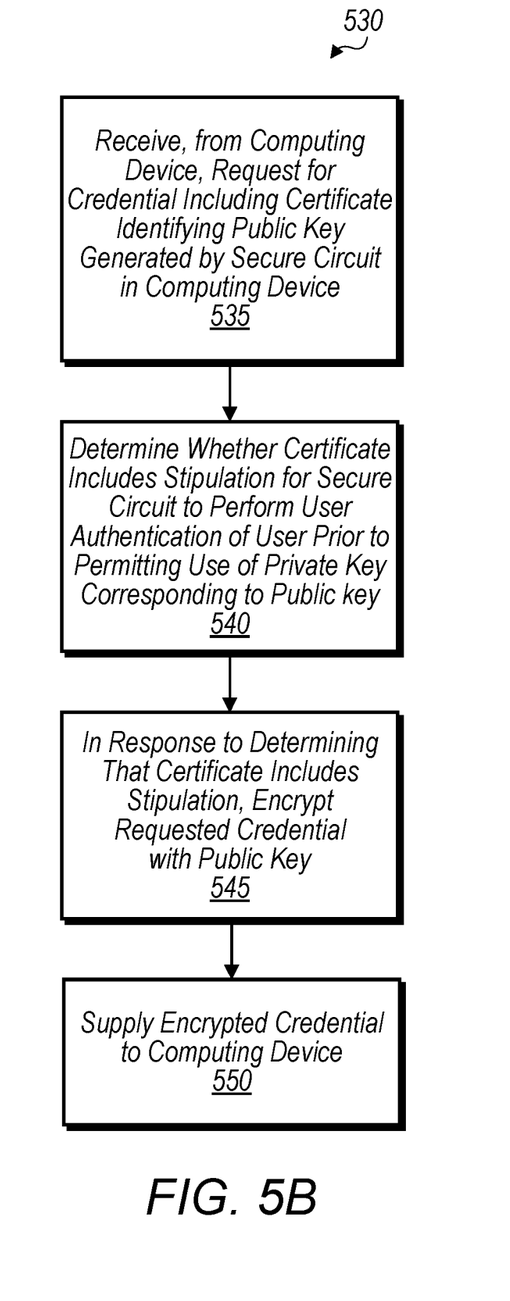

Turning now to FIG. 5B, a block diagram of another method 530 for securely communicating a credential depicted. Method 530 is one embodiment of a method that may be performed by credential storage storing and supplying a credential to a requesting device such as credential storage 160 discussed above.

Method 530 begins in step 53 with a credential storage receiving, from a first computing device (e.g., device 100), a first request (e.g., credential request 162) for a credential (e.g., credential 164) to be supplied by the first computing device to a system external (e.g., external system 102) to the first computing device. In various embodiments, the first request includes a first certificate (e.g., delivery certificate 154) identifying a public key (e.g., public key 232) generated by a secure circuit (e.g., SEP 130) in the first computing device. In some embodiments, the first certificate is issued by a certificate authority (e.g., verification service 150) associated with a manufacturer of the computing device. In some embodiments, in response to receiving the first request, the credential storage contacts an issuing authority (e.g., issuing authority 106) to obtain the credential. In some embodiments, the issuing authority issues a transaction instrument having the credential, and the credential is a payment credential usable to conduct a transaction with a merchant system (e.g., merchant system 404). In step 540, the credential storage determines whether the first certificate includes a stipulation (e.g., user authentication stipulation 236) for the secure circuit to perform a user authentication prior to permitting use of a private key (e.g., delivery key 134) corresponding to the public key. In step 545, in response to determining that the first certificate includes the stipulation, the credential storage encrypts the requested credential with the public key. In step 550, the credential storage supplies the encrypted credential to the first computing device.

In various embodiments, method 530 further includes the credential storage receiving, from a second computing device, a second request for the credential, determining whether a second certificate included in the second request includes the stipulation to perform a user authentication prior to permitting use of a private key, and, in response to determining that the second certificate omits the stipulation, providing, to the second computing device, only a portion of the credential. In some embodiments, the credential includes a primary account number and a card verification value (CVV) for conducting a transaction with a merchant system, and the portion of the credential includes the primary account number and does not include the CVV.

Figure 5C:
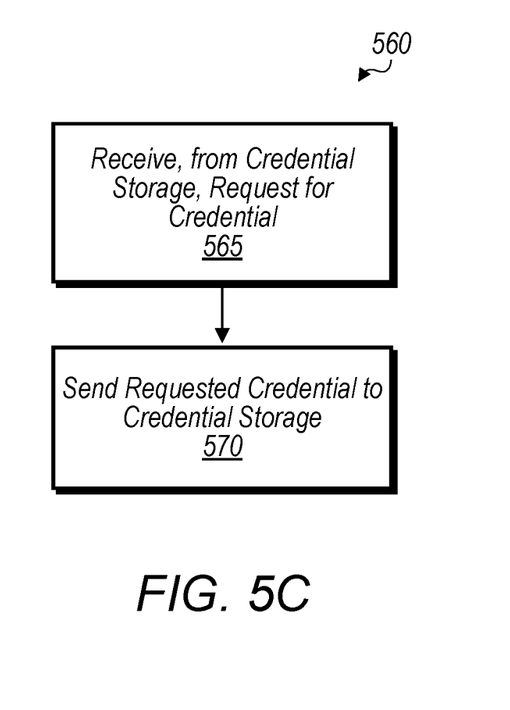

Turning now to FIG. 5C, a block diagram of another method 560 for securely communicating a credential is depicted. Method 560 is one embodiment of a method that may be performed by an authority that issued a credential such as issuing authority 106 discussed above.

Method 560 begins in step 565 with an issuing authority of a credential receiving, from a credential storage (e.g., credential storage 160), a request (e.g., IA request 254) for a credential (e.g., a credential 164). In various embodiments, the credential storage is configured to use a certificate (e.g., delivery certificate 154) supplied by a computing device (e.g., device 100) to verify that the computing device includes a secure circuit (e.g., SEP 130) configured to perform a user authentication. In some embodiments, the certificate is issued by a hardware verification service (e.g., service 150) operable to confirm that the secure circuit is present in the computing device and to verify that the secure circuit has expressed an intention (e.g., stipulation 236) to perform a biometric authentication prior to using the private key. In step 570, the issuing authority sends the requested credential to the credential storage. In various embodiments, the credential storage is configured to use a public key (e.g., public key 232) included in the certificate to encrypt the credential for delivery to the secure circuit in the computing device, and the secure circuit is configured to use a private key (e.g., delivery key 134) to decrypt the encrypted credential in response to performance of the user authentication. In some embodiments, the secure circuit is configured to supply the decrypted credential to a wallet application (e.g., wallet application 122) executable on a processor (e.g., CPU 110) distinct from the secure circuit, and the wallet application is executable to present the decrypted credential to a merchant system (e.g., system 404 or external system 102). In some embodiments, method 560 includes the issuing authority facilitating a card-not-present transaction (e.g., transaction exchange 400) using the credential and conducted via a website of the merchant system.

Exemplary Computer System

Figure 6:
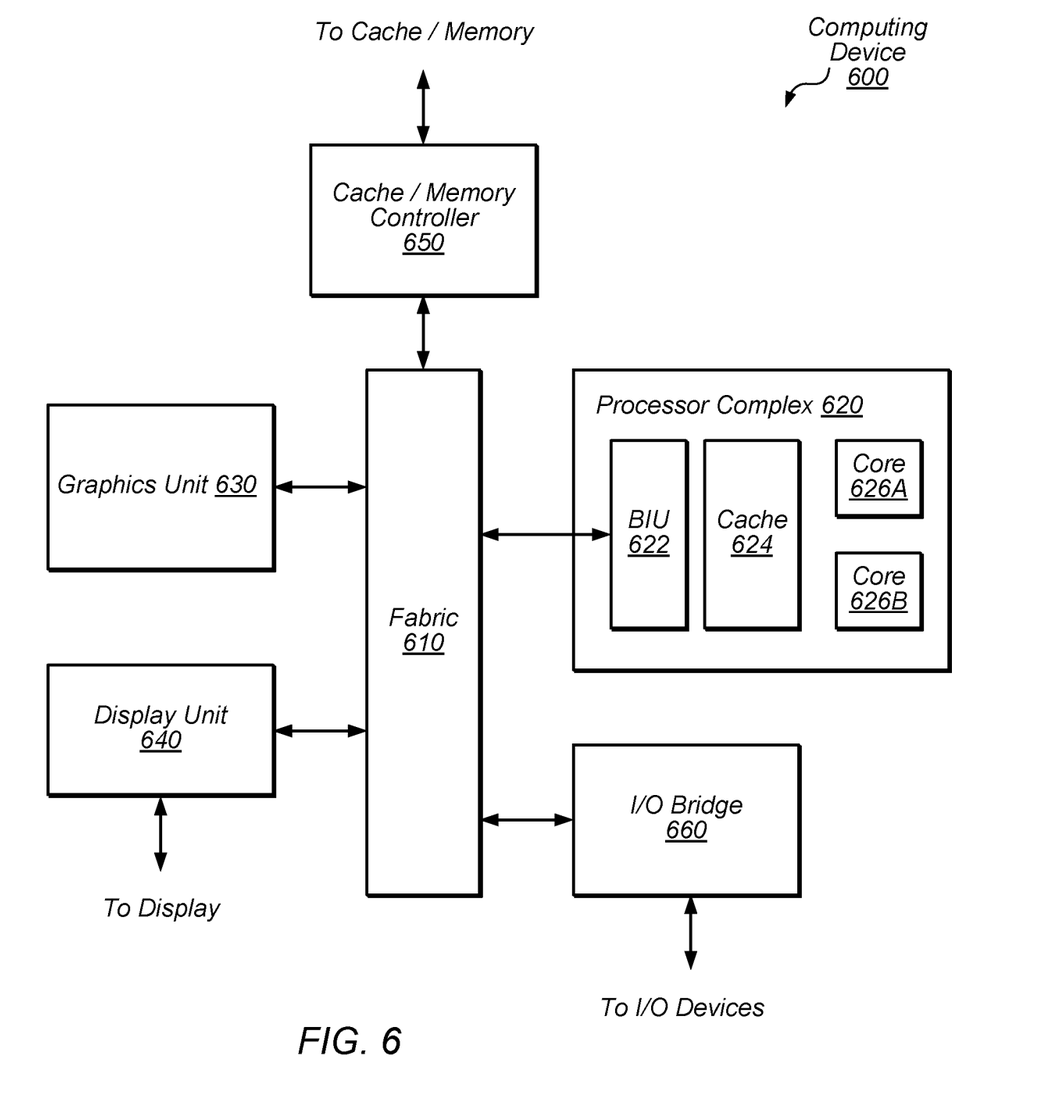
FIG. 6 is a block diagram illustrating one embodiment of an exemplary computer system.

Turning now to FIG. 6, a block diagram illustrating an exemplary embodiment of a computing device 600, which may be used to implement functionality of one or more of components 100-104, is shown. Device 600 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 600 includes fabric 610, processor complex 620, graphics unit 630, display unit 640, cache/memory controller 650, input/output (I/O) bridge 660. In some embodiments, elements of device 600 may be included within a system on a chip (SOC).

Fabric 610, which may correspond to interconnect 300 discussed above, may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally. As used herein, the term "coupled to" may indicate one or more connections between elements, and a coupling may include intervening elements. For example, in FIG. 6, graphics unit 630 may be described as "coupled to" a memory through fabric 610 and cache/memory controller 650. In contrast, in the illustrated embodiment of FIG. 6, graphics unit 630 is "directly coupled" to fabric 610 because there are no intervening elements.

In the illustrated embodiment, processor complex 620, which may correspond to CPU 110, includes bus interface unit (BIU) 622, cache 624, and cores 626A and 626B. In various embodiments, processor complex 620 may include various numbers of processors, processor cores and/or caches. For example, processor complex 620 may include 1, 2, or 4 processor cores, or any other suitable number. In one embodiment, cache 624 is a set associative L2 cache. In some embodiments, cores 626A and/or 626B may include internal instruction and/or data caches. In some embodiments, a coherency unit (not shown) in fabric 610, cache 624, or elsewhere in device 600 may be configured to maintain coherency between various caches of device 600. BIU 622 may be configured to manage communication between processor complex 620 and other elements of device 600. Processor cores such as cores 626 may be configured to execute instructions of a particular instruction set architecture (ISA), which may include operating system instructions and user application instructions such as wallet application 122. These instructions may be stored in computer readable medium such as a memory coupled to memory controller 650 discussed below.

Graphics unit 630 may include one or more processors and/or one or more graphics processing units (GPU's). Graphics unit 630 may receive graphics-oriented instructions, such as OPENGL®, Metal, or DIRECT3D® instructions, for example. Graphics unit 630 may execute specialized GPU instructions or perform other operations based on the received graphics-oriented instructions. Graphics unit 630 may generally be configured to process large blocks of data in parallel and may build images in a frame buffer for output to a display. Graphics unit 630 may include transform, lighting, triangle, and/or rendering engines in one or more graphics processing pipelines. Graphics unit 630 may output pixel information for display images.

Display unit 640 may be configured to read data from a frame buffer and provide a stream of pixel values for display. Display unit 640 may be configured as a display pipeline in some embodiments. Additionally, display unit 640 may be configured to blend multiple frames to produce an output frame. Further, display unit 640 may include one or more interfaces (e.g., MIPI® or embedded display port (eDP)) for coupling to a user display (e.g., a touchscreen or an external display).

Cache/memory controller 650 may be configured to manage transfer of data between fabric 610 and one or more caches and/or memories. For example, cache/memory controller 650 may be coupled to an L3 cache, which may in turn be coupled to a system memory. In other embodiments, cache/memory controller 650 may be directly coupled to a memory. In some embodiments, cache/memory controller 650 may include one or more internal caches. Memory coupled to controller 650 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 650 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 620 to cause device 600 to perform functionality described herein.

I/O bridge 660 may include various elements configured to implement universal serial bus (USB) communications, security, audio, and/or low-power always-on functionality, for example. I/O bridge 660 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 660. For example, these devices may include various types of wireless communication (e.g., Wi-Fi™, Bluetooth®, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
   a processor; and
   memory having program instructions stored therein that are executable by the processor to implement an application operable to supply a credential to an external system; and
   a secure circuit configured to:
      send, to a credential storage, a request for the credential, wherein the request includes a first certificate identifying a first public key and a stipulation to perform a user authentication before permitting use of a first private key corresponding to the first public key;
      receive, from the credential storage, the credential encrypted using the first public key; and
      based on the stipulation identified in the first certificate, perform the user authentication prior to decrypting the encrypted credential with the first private key and supplying the decrypted credential to the application.

2. The computing device of claim 1, wherein the secure circuit is configured to:
   provide information about hardware included in the computing device to a hardware verification service; and
   in response to a verification of the provided information, receive the first certificate from the hardware verification service.

3. The computing device of claim 2, wherein providing the information to the hardware verification service includes:
   providing a second certificate that indicates a presence of the secure circuit in the computing device, wherein the second certificate includes a second public key;
   generating an attestation using a second private key maintained by the secure circuit and corresponding to the second public key; and
   issuing the attestation with a certificate signing request (CSR) to obtain the first certificate from the hardware verification service in response to a verification of the attestation and the second certificate.

4. The computing device of claim 3, wherein the secure circuit is provisioned with the second certificate by a manufacture of the computing device, and wherein the CSR indicates the stipulation to perform the user authentication before permitting use of the first private key.

5. The computing device of claim 1, wherein the credential is a payment credential usable by a merchant system to conduct a transaction; and
   wherein the application is executable to:
      receive the decrypted payment credential from the secure circuit; and
      populate a payment form of the merchant system with the decrypted payment credential.

6. The computing device of claim 5, wherein the payment form is a webpage of the merchant system, and wherein populating the payment form includes populating a first field with a primary account number of the payment credential and a second field with a card verification value (CVV) of the payment credential.

7. The computing device of claim 1, further comprising:
   a biometric sensor configured to collect biometric data from a user of the computing device; and
   wherein the secure circuit is configured to perform the user authentication by:
      retrieving biometric data of an authorized user of the computing device;
      comparing the collected biometric data with the retrieved biometric data of the authorized user; and
      based on the comparing, determining whether to use the first private key to decrypt the credential in response to a request from the application.

8. The computing device of claim 7, wherein the biometric sensor includes a camera configured to collect the biometric data from a user's face.

9. The computing device of claim 8, further comprising:
   a controller circuit coupled to a button, wherein the controller circuit is configured to detect when the button has been pressed and provide, to the secure circuit, a timestamp corresponding to the button being pressed; and
   wherein performing the user authentication includes the secure circuit confirming that the timestamp is within an interval of the camera collecting the biometric data from the user's face.

10. The computing device of claim 1, wherein the secure circuit is configured to:

store the received encrypted credential for one or more subsequent uses without another retrieval of the credential from the credential storage;
receive a request from the application to use the credential;
in response to the request from the application:
based on the stipulation, perform the user authentication; and
based on the user authentication, use the first private key to decrypt the stored encrypted credential.

11. The computing device of claim 1, wherein the secure circuit is isolated from access except through a mailbox mechanism, and wherein the secure circuit is configured to supply the decrypted credential to the application via the mailbox mechanism.

12. A method, comprising:
a credential storage receiving, from a first computing device, a first request for a credential to be supplied by the first computing device to a system external to the first computing device, wherein the first request includes a first certificate identifying a public key generated by a secure circuit in the first computing device;
the credential storage determining whether the first certificate includes a stipulation for the secure circuit to perform a user authentication prior to permitting use of a private key corresponding to the public key;
in response to determining that the first certificate includes the stipulation:
the credential storage encrypting the requested credential with the public key; and
the credential storage supplying the encrypted credential to the first computing device.

13. The method of claim 12, further comprising:
the credential storage receiving, from a second computing device, a second request for the credential;
the credential storage determining whether a second certificate included in the second request includes the stipulation to perform a user authentication prior to permitting use of a private key; and
in response to determining that the second certificate omits the stipulation, the credential storage providing, to the second computing device, only a portion of the credential.

14. The method of claim 13, wherein the credential includes a primary account number and a card verification value (CVV) for conducting a transaction with a merchant system, and wherein the portion of the credential includes the primary account number and does not include the CVV.

15. The method of claim 12, wherein the first certificate is issued by a certificate authority associated with a manufacturer of the first computing device.

16. The method of claim 12, further comprising:
in response to receiving the first request, the credential storage contacting an issuing authority to obtain the credential, wherein the issuing authority issues a transaction instrument having the credential, and wherein the credential is a payment credential usable to conduct a transaction with a merchant system.

* * * * *